United States Patent Office 3,422,813
Patented Jan. 21, 1969

3,422,813
METHOD FOR STERILIZATION OF MALES
Silas A. Braley, Jr., and Jerry D. Helmer, Midland, Mich., assignors to Dow Corning Corporation, Midland, Mich., a corporation of Michigan
No Drawing. Filed June 21, 1965, Ser. No. 465,703
U.S. Cl. 128—1                                                                            2 Claims
Int. Cl. A61f 5/42

ABSTRACT OF THE DISCLOSURE

A non-surgical method for sterilization of males is disclosed. A plug of inert elastomeric material, preferably a silicone elastomer, is inserted in the sperm-carrying tubes of the male, thereby permanently occluding those tubes and blocking the flow of sperm. The plug can be surgically removed at a later time, if desired.

---

The present invention relates to sterilization of males, and more particularly to sterilization methods which do not require surgery.

Heretofore, various methods of sterilization of males have been proposed. Non-surgical methods to date have been not wholly successful. While with some chemical treatments, results in the vast majority of cases have been good, a degree of uncertainty of the success of the treatment remains. Furthermore, such treatments are usually only temporary in nature and in some cases undesirable side effects have occurred.

The only certain male sterilization methods to date have involved surgical procedures. The most prevalent method in use today involves interrupting the lumen of the tubes carrying the sperm from the testes, usually by tying it off with a tight ligature. This, of course, is an effective method of achieving a permanent sterilization, but it would be desirable to eliminate the necessity for surgery. It is often desirable to re-establish fecundity after such a procedure, but it is extremely difficult to do so because of repeated scarring at the site of the ligation and/or the anastomoses.

A primary object of the present invention is to provide a method of sterilization of males which is completely effective, but which eliminates the necessity for surgery.

A further object is to provide a method of sterilization of males wherein it is later possible to restore with surety the power of fecundation.

These and other objects are accomplished in accordance with the present invention by producing a plug of inert elastomeric material in the sperm carrying tubes, for instance, the vas deferens, or ductus deferens, to occlude the duct and thereby block the flow of sperm. Room temperature vulcanizing, or self-curing, silicone rubber has been found to be particularly useful for the process. Since silicone elastomers have been found to be inert with respect to biological attack and are easily tolerated by tissues, these materials are used for many medical and surgical uses.

In order to form the plug without the necessity of surgery, a quantity of self-curing elastomer, together with its catalyst; in liquid form is drawn into a hypodermic syringe and injected into the duct where it is allowed to cure and forms a solid plug within the duct. Since the duct is not severed in the process, it is possible at a later time to remove the plug surgically by slitting the side of the duct and removing the plug. The quantity of elastomer used must, of necessity, vary with the individual application. It must be sufficient to seal off the duct, but if possible removal is contemplated the quantity should be kept small. Obviously, the larger the length of the plug the more difficult it is to remove. Even if there is no possibility that subsequent removal of the occlusion may be desired, there appears to be no valid reason for producing a plug of excessive length, and the injection of a large excess of material could cause blockage of the cowper's gland or other portions of the seminal tract.

Tests of this method on rabbits have been made using "Silastic" S–5392 Medical Grade Elastomer, which is a silicone rubber of the room temperature vulcanizing type, sold by the Dow Corning Corporation. After injecting this material into the vas of the rabbits and making a twice-weekly study of the semen ejaculate it was found that the sperm content of the semen was reduced to aspermic level within five ejaculations with 100 percent effectiveness.

Although more difficult to perform, a similar technique may be used to occlude the fallopian tubes in females. Again the plugs may later be surgically removed to restore fertility.

The specific type of material used in this process is not critical except to the extent that it is chemically inert with respect to its environment after injection and that there is no adverse body reaction to it. Preferably, it should have a relatively short curing time to prevent migration once it has been injected in place. Various commercially available materials meet these criteria.

Variations and modifications of the invention as well as other attendant advantages, will become obvious to skilled workers in the art from a consideration of the foregoing. It is therefore to be understood that within the scope of the appended claims the invention may be practiced, otherwise than as specifically described herein.

That which is claimed is:

1. A method of sterilization of males comprising injecting through the walls of their vas deferens, in liquid form, a quantity of self-curing elastomeric material, said quantity being sufficient upon curing to form a permanent occlusion of the vas deferens of said males.

2. A method of sterilization as defined in claim 1 wherein said self-curing elastomeric material is a self-curing silicone elastomer.

References Cited

UNITED STATES PATENTS

| | | | |
|---|---|---|---|
| 3,042,021 | 7/1962 | Read | 128—1 |
| 3,066,667 | 12/1962 | Berry | 128—1 |
| 3,313,292 | 4/1967 | Cook | 128—2 |

DALTON L. TRULUCK, *Primary Examiner.*